(12) United States Patent
Katzer et al.

(10) Patent No.: US 9,883,381 B1
(45) Date of Patent: Jan. 30, 2018

(54) PROVIDING SECURE ACCESS TO SMART CARD APPLICATIONS

(75) Inventors: Robin Dale Katzer, Olathe, KS (US); Todd N. Koellner, Overland Park, KS (US); Kevin Zhu, Overland Park, KS (US)

(73) Assignee: SPRINT COMMUNICATIONS COMPANY L.P., Overland Park, KS (US)

(*) Notice: Subject to any disclaimer, the term of this patent is extended or adjusted under 35 U.S.C. 154(b) by 1606 days.

(21) Appl. No.: 11/866,410

(22) Filed: Oct. 2, 2007

(51) Int. Cl.
*H04W 12/00* (2009.01)

(52) U.S. Cl.
CPC .................................. *H04W 12/00* (2013.01)

(58) Field of Classification Search
USPC .................................................. 455/410, 411
See application file for complete search history.

(56) References Cited

U.S. PATENT DOCUMENTS

| | | | |
|---|---|---|---|
| 5,276,311 A | 1/1994 | Hennige | |
| 5,453,601 A | 9/1995 | Rosen | |
| 5,496,966 A | 3/1996 | Hightower et al. | |
| 5,530,232 A | 6/1996 | Taylor | |
| 5,590,038 A | 12/1996 | Pitroda | |
| 5,923,884 A | 7/1999 | Peyret et al. | |
| 5,989,720 A | 11/1999 | Taniyama | |
| 6,000,608 A | 12/1999 | Dort | |
| 6,012,634 A | 1/2000 | Borgan et al. | |
| 6,014,286 A | 2/2000 | Baradley et al. | |
| 6,122,625 A | 9/2000 | Rosen | |
| 6,142,369 A | 11/2000 | Jonstromer | |
| 6,199,161 B1 | 3/2001 | Ahvenainen | |
| 6,250,557 B1 | 6/2001 | Forslund et al. | |
| 6,290,127 B1 | 9/2001 | Schilling | |
| 6,298,442 B1 | 10/2001 | Kocher et al. | |
| 6,314,409 B2 | 11/2001 | Schneck et al. | |
| 6,360,954 B1 | 3/2002 | Bernardo | |
| 6,390,374 B1 | 5/2002 | Carper et al. | |
| 6,405,181 B2 | 6/2002 | Lent et al. | |
| 6,446,049 B1 | 9/2002 | Janning et al. | |
| 6,466,777 B1 | 10/2002 | Urita | |
| 6,490,601 B1 | 12/2002 | Markus et al. | |
| 6,584,326 B1 | 6/2003 | Boydston et al. | |
| 6,591,098 B1 | 7/2003 | Shieh et al. | |
| 6,631,849 B2 | 10/2003 | Blossom | |
| 6,655,587 B2 | 12/2003 | Andrews et al. | |
| 6,679,423 B2 | 1/2004 | Ijichi et al. | |
| 6,732,919 B2 | 5/2004 | Macklin et al. | |
| 6,755,342 B1 | 6/2004 | Jordan, Jr. | |
| 6,782,251 B2 * | 8/2004 | Kagay, Jr. ..................... | 455/410 |
| 6,810,521 B1 | 10/2004 | Gelgon et al. | |
| 6,817,521 B1 | 11/2004 | Matada | |
| 6,824,064 B2 | 11/2004 | Guthery et al. | |
| 6,879,965 B2 | 4/2005 | Fung et al. | |

(Continued)

OTHER PUBLICATIONS

Office Action dated May 24, 2011, U.S. Appl. No. 12/348,371.

(Continued)

*Primary Examiner* — Tsan-Yu J Huang (57) ABSTRACT

A method is provided for secure access to a smart card application. An alert is received related to a mobile device having the smart card application. Access by the mobile device to the smart card application is restricted responsive to receiving the alert.

10 Claims, 5 Drawing Sheets

(56) References Cited

U.S. PATENT DOCUMENTS

| | | | |
|---|---|---|---|
| 6,880,085 B1 | 4/2005 | Balczewski et al. | |
| 6,880,761 B1 | 4/2005 | Ritter et al. | |
| 6,886,741 B1 | 5/2005 | Salveson | |
| 6,896,183 B2 | 5/2005 | Takano | |
| 6,938,821 B2 | 9/2005 | Gangi | |
| 7,043,230 B1 | 5/2006 | Geddes et al. | |
| 7,117,485 B2 | 10/2006 | Wilkinson et al. | |
| 7,142,840 B1 | 11/2006 | Geddes et al. | |
| 7,146,159 B1* | 12/2006 | Zhu | 455/414.1 |
| 7,194,438 B2 | 3/2007 | Sovio et al. | |
| 7,233,785 B2 | 6/2007 | Yamagishi et al. | |
| 7,260,390 B1* | 8/2007 | Skinner et al. | 455/420 |
| 7,269,256 B2 | 9/2007 | Rosen | |
| 7,275,095 B1 | 9/2007 | Lebouill | |
| 7,275,105 B2* | 9/2007 | Bloch et al. | 709/227 |
| 7,343,351 B1 | 3/2008 | Bishop et al. | |
| 7,376,839 B2* | 5/2008 | Carta et al. | 713/185 |
| 7,413,113 B1 | 8/2008 | Zhu | |
| 7,434,723 B1 | 10/2008 | White et al. | |
| 7,475,044 B1 | 1/2009 | Kawai et al. | |
| 7,494,058 B2 | 2/2009 | Bonalle et al. | |
| 7,494,067 B1 | 2/2009 | Zhu | |
| 7,533,063 B2 | 5/2009 | Kianian | |
| 7,546,266 B2 | 6/2009 | Beirne et al. | |
| 7,546,956 B2 | 6/2009 | Adams et al. | |
| 7,562,818 B1 | 7/2009 | Bierbaum et al. | |
| 7,567,795 B1 | 7/2009 | Champion et al. | |
| 7,568,631 B2 | 8/2009 | Gibbs et al. | |
| 7,575,177 B2 | 8/2009 | Killian et al. | |
| 7,637,425 B2* | 12/2009 | Mock et al. | 235/380 |
| 7,644,039 B1 | 1/2010 | Magee et al. | |
| 7,644,859 B1 | 1/2010 | Zhu | |
| 7,707,113 B1 | 4/2010 | DiMartino et al. | |
| 7,729,948 B1 | 6/2010 | Gailloux et al. | |
| 7,748,636 B2 | 7/2010 | Finn | |
| 7,819,307 B2 | 10/2010 | Lyons et al. | |
| 7,822,688 B2 | 10/2010 | Labrou et al. | |
| 7,853,782 B1 | 12/2010 | Geddes | |
| 7,926,713 B2 | 4/2011 | Yamada et al. | |
| 7,926,714 B1 | 4/2011 | Zhu | |
| 7,974,926 B2 | 7/2011 | Ohmori et al. | |
| 7,980,476 B2 | 7/2011 | D'Albore | |
| 7,988,060 B2 | 8/2011 | Killian et al. | |
| 7,996,324 B2 | 8/2011 | Bishop et al. | |
| 8,055,184 B1 | 11/2011 | DiMartino et al. | |
| 8,060,449 B1 | 11/2011 | Zhu | |
| 8,107,953 B2 | 1/2012 | Zimmerman et al. | |
| 8,123,128 B1 | 2/2012 | Zhu | |
| 8,126,806 B1 | 2/2012 | DiMartino et al. | |
| 8,165,961 B2 | 4/2012 | DiMartino et al. | |
| 8,200,582 B1 | 6/2012 | Zhu | |
| 8,244,169 B1 | 8/2012 | DiMartino et al. | |
| 8,249,654 B1 | 8/2012 | Zhu | |
| 8,249,935 B1 | 8/2012 | DiMartino et al. | |
| 8,250,662 B1 | 8/2012 | Zhu | |
| 8,285,329 B1 | 10/2012 | Zhu | |
| 8,290,433 B2 | 10/2012 | Fisher et al. | |
| 8,332,272 B2 | 12/2012 | Fisher | |
| 8,352,323 B2 | 1/2013 | Fisher | |
| 8,359,070 B1 | 1/2013 | Zhu | |
| 8,401,904 B1 | 3/2013 | Simakov et al. | |
| 8,468,095 B1 | 6/2013 | DiMartino et al. | |
| 8,566,168 B1 | 10/2013 | Bierbaum et al. | |
| 8,577,731 B1 | 11/2013 | Cope et al. | |
| 8,594,563 B2 | 11/2013 | Waters et al. | |
| 8,655,310 B1 | 2/2014 | Katzer et al. | |
| 8,719,102 B1 | 5/2014 | DiMartino et al. | |
| 8,768,845 B1 | 7/2014 | Persson et al. | |
| 8,862,181 B1 | 10/2014 | Cope et al. | |
| 8,909,139 B2 | 12/2014 | Aldana et al. | |
| 8,983,374 B2 | 3/2015 | Wiley | |
| 9,420,403 B1 | 8/2016 | Annan et al. | |
| 9,818,104 B1 | 11/2017 | Katzer et al. | |
| 2001/0005184 A1 | 6/2001 | Tsuno et al. | |
| 2001/0013551 A1 | 8/2001 | Ramachandran | |
| 2002/0006806 A1 | 1/2002 | Kinnunen et al. | |
| 2002/0011519 A1 | 1/2002 | Shults, III | |
| 2002/0016838 A1 | 2/2002 | Geluc et al. | |
| 2002/0018016 A1 | 2/2002 | Radonic | |
| 2002/0038258 A1* | 3/2002 | Inoue et al. | 705/26 |
| 2002/0052193 A1 | 5/2002 | Chetty | |
| 2002/0052754 A1 | 5/2002 | Joyce et al. | |
| 2002/0062284 A1 | 5/2002 | Kawan | |
| 2002/0088852 A1 | 7/2002 | Ohta et al. | |
| 2002/0123971 A1 | 9/2002 | Maritzen et al. | |
| 2002/0128982 A1 | 9/2002 | Gefwert et al. | |
| 2002/0136199 A1 | 9/2002 | Hartmaier | |
| 2002/0147913 A1 | 10/2002 | Lun Yip | |
| 2002/0195487 A1 | 12/2002 | Hosogoe | |
| 2003/0009382 A1 | 1/2003 | D'Arbeloff et al. | |
| 2003/0028481 A1 | 2/2003 | Flitcroft et al. | |
| 2003/0032409 A1 | 2/2003 | Hutcheson et al. | |
| 2003/0045328 A1 | 3/2003 | Natsuno | |
| 2003/0070080 A1 | 4/2003 | Rosen | |
| 2003/0083933 A1 | 5/2003 | McAlear | |
| 2003/0125054 A1 | 7/2003 | Garcia | |
| 2003/0126094 A1 | 7/2003 | Fisher et al. | |
| 2003/0149900 A1 | 8/2003 | Glassman et al. | |
| 2003/0161503 A1 | 8/2003 | Kramer | |
| 2003/0211862 A1 | 11/2003 | Hutchison, IV et al. | |
| 2003/0220876 A1 | 11/2003 | Burger et al. | |
| 2003/0233320 A1 | 12/2003 | Connor, Jr. | |
| 2004/0010462 A1 | 1/2004 | Moon et al. | |
| 2004/0044622 A1 | 3/2004 | Blott et al. | |
| 2004/0093265 A1 | 5/2004 | Ramchandani et al. | |
| 2004/0103063 A1 | 5/2004 | Takayama et al. | |
| 2004/0122685 A1 | 6/2004 | Bunce | |
| 2004/0122771 A1 | 6/2004 | Celi, Jr. et al. | |
| 2004/0139024 A1 | 7/2004 | So | |
| 2004/0159700 A1 | 8/2004 | Khan et al. | |
| 2004/0166839 A1 | 8/2004 | Okkonen et al. | |
| 2004/0192303 A1 | 9/2004 | Puthenkulam | |
| 2004/0198333 A1 | 10/2004 | Zanaty | |
| 2004/0203601 A1 | 10/2004 | Morriss et al. | |
| 2004/0204070 A1 | 10/2004 | August et al. | |
| 2004/0218741 A1 | 11/2004 | Welton | |
| 2004/0260647 A1 | 12/2004 | Blinn et al. | |
| 2005/0186989 A1 | 8/2005 | Cocita | |
| 2005/0216424 A1 | 9/2005 | Gandre et al. | |
| 2005/0234778 A1 | 10/2005 | Sperduti et al. | |
| 2005/0278192 A1 | 12/2005 | Cantini et al. | |
| 2006/0073808 A1 | 4/2006 | Buchert | |
| 2006/0085847 A1 | 4/2006 | Ikeuchi et al. | |
| 2006/0136334 A1 | 6/2006 | Atkinson et al. | |
| 2006/0164318 A1 | 7/2006 | Lastinger et al. | |
| 2006/0165060 A1 | 7/2006 | Dua | |
| 2006/0167823 A1 | 7/2006 | York et al. | |
| 2006/0191995 A1 | 8/2006 | Stewart et al. | |
| 2006/0211408 A1 | 9/2006 | Yamagishi et al. | |
| 2006/0214005 A1 | 9/2006 | Agami et al. | |
| 2006/0218635 A1* | 9/2006 | Kramer et al. | 726/22 |
| 2006/0237528 A1 | 10/2006 | Bishop et al. | |
| 2006/0261949 A1 | 11/2006 | Kim et al. | |
| 2007/0010213 A1 | 1/2007 | Dewan | |
| 2007/0011461 A1 | 1/2007 | Jeng | |
| 2007/0055785 A1 | 3/2007 | Stevens | |
| 2007/0060200 A1 | 3/2007 | Boris et al. | |
| 2007/0080215 A1 | 4/2007 | Ramachandran et al. | |
| 2007/0095892 A1 | 5/2007 | Lyons et al. | |
| 2007/0125840 A1 | 6/2007 | Law et al. | |
| 2007/0145152 A1 | 6/2007 | Jogand-Coulomb et al. | |
| 2007/0155362 A1 | 7/2007 | Davis | |
| 2007/0169043 A1 | 7/2007 | Violleau et al. | |
| 2007/0169183 A1 | 7/2007 | Kipnis et al. | |
| 2007/0197261 A1 | 8/2007 | Humbel | |
| 2007/0198410 A1 | 8/2007 | Labgold et al. | |
| 2007/0223685 A1 | 9/2007 | Boubion et al. | |
| 2007/0233615 A1 | 10/2007 | Tumminaro | |
| 2007/0234427 A1 | 10/2007 | Gardner et al. | |
| 2007/0244811 A1 | 10/2007 | Tumminaro | |
| 2007/0248232 A1 | 10/2007 | Driscoll et al. | |
| 2007/0250599 A1 | 10/2007 | Takayama et al. | |
| 2007/0255620 A1 | 11/2007 | Tumminaro et al. | |
| 2007/0255652 A1 | 11/2007 | Tumminaro et al. | |

(56) References Cited

U.S. PATENT DOCUMENTS

| | | |
|---|---|---|
| 2007/0278290 A1 | 12/2007 | Messerges et al. |
| 2007/0281664 A1 | 12/2007 | Kaneko et al. |
| 2007/0291995 A1 | 12/2007 | Rivera |
| 2008/0059379 A1 | 3/2008 | Ramaci et al. |
| 2008/0067240 A1 | 3/2008 | Nakano et al. |
| 2008/0078831 A1 | 4/2008 | Johnson et al. |
| 2008/0116264 A1 | 5/2008 | Hammad et al. |
| 2008/0121687 A1 | 5/2008 | Buhot |
| 2008/0126260 A1 | 5/2008 | Cox et al. |
| 2008/0165006 A1 | 7/2008 | Phillips |
| 2008/0201212 A1 | 8/2008 | Hammad et al. |
| 2008/0238610 A1 | 10/2008 | Rosenberg |
| 2008/0297306 A1 | 12/2008 | Huajun et al. |
| 2008/0315989 A1 | 12/2008 | Mirkazemi-Moud et al. |
| 2009/0018964 A1 | 1/2009 | Liu et al. |
| 2009/0046858 A1 | 2/2009 | Iyer et al. |
| 2009/0050689 A1 | 2/2009 | Sako et al. |
| 2009/0055278 A1 | 2/2009 | Nemani |
| 2009/0078761 A1 | 3/2009 | Sines |
| 2009/0097531 A1 | 4/2009 | Franceschini et al. |
| 2009/0112765 A1 | 4/2009 | Skowronek |
| 2009/0182634 A1 | 7/2009 | Park et al. |
| 2009/0253409 A1 | 10/2009 | Slavov et al. |
| 2009/0270174 A1 | 10/2009 | Kelly et al. |
| 2009/0313689 A1 | 12/2009 | Nyström et al. |
| 2009/0327292 A1 | 12/2009 | Janssen et al. |
| 2010/0030651 A1 | 2/2010 | Matotek et al. |
| 2010/0094752 A1 | 4/2010 | Heath |
| 2010/0133337 A1 | 6/2010 | Van Rensburg |
| 2010/0185545 A1 | 7/2010 | Royyuru et al. |
| 2011/0006112 A1 | 1/2011 | Mueller |
| 2011/0053560 A1 | 3/2011 | Jain et al. |
| 2011/0165836 A1 | 7/2011 | Dixon et al. |
| 2011/0184867 A1 | 7/2011 | Varadarajan |
| 2011/0225655 A1 | 9/2011 | Niemela et al. |
| 2011/0237296 A1 | 9/2011 | Coppinger |
| 2011/0251892 A1 | 10/2011 | Laracey |
| 2012/0108296 A1 | 5/2012 | Coppinger |
| 2012/0123935 A1 | 5/2012 | Brudnicki et al. |
| 2012/0203701 A1 | 8/2012 | Ayuso de Paul |
| 2013/0159186 A1 | 6/2013 | Brudnicki et al. |
| 2013/0305333 A1 | 11/2013 | Katzer et al. |

OTHER PUBLICATIONS

Notice of Allowance dated Sep. 9, 2011, U.S. Appl. No. 12/348,371.
Supplemental Notice of Allowance dated Oct. 6, 2011, U.S. Appl. No. 12/348,371.
FAIPP Pre-Interview Communication dated Feb. 21, 2012, U.S. Appl. No. 13/270,205.
Notice of Allowance dated Apr. 9, 2012, U.S. Appl. No. 13/270,205.
Office Action—Restriction dated Mar. 14, 2011, U.S. Appl. No. 12/371,901.
Office Action dated Apr. 14, 2011, U.S. Appl. No. 12/371,901.
Final Office Action dated Oct. 14, 2011, U.S. Appl. No. 12/371,901.
Advisory Action dated Feb. 9, 2012, U.S. Appl. No. 12/371,901.
Notice of Allowance dated Feb. 28, 2014, U.S. Appl. No. 12/371,901.
Office Action dated Oct. 12, 2006; U.S. Appl. No. 10/901,630, filed Jul. 28, 2004.
Office Action dated Apr. 5, 2007; U.S. Appl. No. 10/901,630, filed Jul. 28, 2004.
Office Action dated Oct. 9, 2007; U.S. Appl. No. 10/901,630, filed Jul. 28, 2007.
Notice of Allowance dated Apr. 8, 2008; U.S. Appl. No. 10/901,630, filed Jul. 28, 2004.
Office Action dated Apr. 16, 2009; U.S. Appl. No. 12/172,813, filed Jul. 14, 2008.
Notice of Allowance dated Sep. 9, 2009; U.S. Appl. No. 12/172,813, filed Jul. 14, 2008.
Office Action dated Aug. 20, 2010; U.S. Appl. No. 12/631,372, filed Dec. 4, 2009.
Notice of Allowance dated Dec. 14, 2010; U.S. Appl. No. 12/631,372, filed Dec. 4, 2009.
Office Action dated Jul. 7, 2011; U.S. Appl. No. 13/045,306.
Notice of Allowance dated Oct. 27, 2011; U.S. Appl. No. 13/045,306, filed Mar. 10, 2010.
Office Action dated Oct. 6, 2009, U.S. Appl. No. 11/695,344.
Final Office Action dated Apr. 13, 2010, U.S. Appl. No. 11/695,344.
Office Action dated Dec. 14, 2010, U.S. Appl. No. 11/695,344.
Office Action dated May 24, 2011, U.S. Appl. No. 11/695,344.
Final Office Action dated Nov. 8, 2011, U.S. Appl. No. 11/695,344.
Office Action dated Jan. 24, 2012, U.S. Appl. No. 11/695,344.
Notice of Allowance dated May 29, 2012, U.S. Appl. No. 11/695,344.
Office Action dated Jul. 9, 2010, U.S. Appl. No. 11/863,228.
Final Office Action dated Nov. 24, 2010, U.S. Appl. No. 11/863,228.
Office Action dated Mar. 14, 2011, U.S. Appl. No. 11/863,228.
Final Office Action dated Jul. 21, 2011; U.S. Appl. No. 11/863,228.
Notice of Allowance dated Apr. 10, 2012; U.S. Appl. No. 11/863,228.
Notice of Allowance dated Sep. 13, 2012, U.S. Appl. No. 13/542,632.
Baker, D., "Real-Time Provisioning of SIM cards: A Boon to GSM Operators", Apr. 13, 2011. http://www.billingworld.com/blogs/baker/2011/04/real-time-provisioning-of-sim-cards-a-boon-to-gsm.aspx.
BlackBerry Enterprise Server for Microsoft Exchange, Version 4.0—Handheld Management Guide, Last Modified Aug. 18, 2006, Research in Motion Limited, Canada.
BlackBerry Enterprise Server for Microsoft Exchange, Version 4.0—Administration Guide, Last Modified Nov. 10, 2006, Research in Motion Limited, Canada.
Derfler, Frank J., et al., "How Networks Work," Sep. 2000, Que Corporation, A Division of MacMillan Computer Publishing, USA.
Anonymous, "Sourcebook '96," Progressive Grocer Sourcebook '96 Supplement, Dec. 1995, pp. Cover-48, Maclean-Hunter Media Inc.
Office Action dated Jun. 17, 2009, U.S. Appl. No. 11/949,759, filed Dec. 3, 2007.
Office Action dated Nov. 13, 2009, U.S. Appl. No. 11/949,759, filed Dec. 3, 2007.
Office Action dated May 25, 2010, U.S. Appl. No. 11/949,759, filed Dec. 3, 2007.
Final Office Action dated Sep. 10, 2010, U.S. Appl. No. 11/949,759, filed Dec. 3, 2007.
Office Action dated Feb. 15, 2011, U.S. Appl. No. 11/949,759, filed Dec. 3, 2007.
Final Office Action dated Aug. 5, 2011, U.S. Appl. No. 11/949,759, filed Dec. 3, 2007.
Notice of Allowance dated Oct. 17, 2011, U.S. Appl. No. 11/949,759, filed Dec. 3, 2007.
Restriction Requirement dated Aug. 6, 2012, U.S. Appl. No. 13/343,708, filed Jan. 4, 2012.
FAIPP Pre-Interview Communication dated Sep. 12, 2012, U.S. Appl. No. 13/343,708, filed Jan. 4, 2012.
FAIPP Office Action dated Nov. 15, 2012, U.S. Appl. No. 13/343,708, filed Jan. 4, 2012.
Notice of Allowance dated Feb. 11, 2013, U.S. Appl. No. 13/343,708, filed Jan. 4, 2012.
Office Action dated Feb. 11, 2013, U.S. Appl. No. 13/535,337, filed Jun. 27, 2012.
Final Office Action dated Jun. 3, 2013, U.S. Appl. No. 13/535,337, filed Jun. 27, 2012.
Advisory Action dated Jul. 30, 2013, U.S. Appl. No. 13/535,337, filed Jun. 27, 2012.
Notice of Allowance dated Dec. 19, 2013, U.S. Appl. No. 13/535,337, filed Jun. 27, 2012.
Pre-Interview Communication dated Nov. 15, 2011, U.S. Appl. No. 13/207,645, filed Aug. 11, 2011.
Notice of Allowance dated Apr. 2, 2012, U.S. Appl. No. 13/207,645, filed Aug. 11, 2011.
Office Action dated Feb. 17, 2009, U.S. Appl. No. 11/863,229, filed Sep. 27 2007.

(56) References Cited

OTHER PUBLICATIONS

Office Action dated Sep. 14, 2009, U.S. Appl. No. 11/863,229, filed Sep. 27, 2007.
Office Action dated Dec. 24, 2009, U.S. Appl. No. 11/863,229, filed Sep. 27, 2007.
Final Office Action dated Jun. 22, 2010, U.S. Appl. No. 11/863,229, filed Sep. 27, 2007.
Office Action dated Mar. 16, 2011, U.S. Appl. No. 11/863,229, filed Sep. 27, 2007.
Final Office Action dated Aug. 22, 2011, U.S. Appl. No. 11/863,229, filed Sep. 27, 2007.
Advisory Action dated Oct. 21, 2011, U.S. Appl. No. 11/863,229, filed Sep. 27, 2007.
Notice of Allowance dated Apr. 9, 2012, U.S. Appl. No. 11/863,229, filed Sep. 27, 2007.
Office Action dated Mar. 6, 2009, U.S. Appl. No. 11/863,632, filed Sep. 28, 2007.
Office Action dated May 6, 2009, U.S. Appl. No. 11/863,632, filed Sep. 28, 2007.
Notice of Allowance dated Dec. 1, 2009, U.S. Appl. No. 11/863,632.
Pre-Interview Communication dated Nov. 9, 2011, U.S. Appl. No. 12/702,270, filed Feb. 8, 2010.
Notice of Allowance dated Dec. 14, 2011, U.S. Appl. No. 12/702,270, filed Feb. 8, 2010.
Office Action dated Mar. 11, 2011, U.S. Appl. No. 12/022,903.
Notice of Allowance dated Jun. 21, 2011, U.S. Appl. No. 12/022,903.
Supplemental Notice of Allowance dated Sep. 13, 2011, U.S. Appl. No. 12/022,903.
Supplemental Notice of Allowance dated Sep. 28, 2011, U.S. Appl. No. 12/022,903.
Office Action dated Mar. 1, 2011, U.S. Appl. No. 12/099,771.
Office Action dated Aug. 3, 2011, U.S. Appl. No. 12/099,771.
Final Office Action dated Jan. 4, 2012, U.S. Appl. No. 12/099,771.
Office Action dated Aug. 21, 2012, U.S. Appl. No. 12/099,771.
Final Office Action dated Feb. 26, 2013, U.S. Appl. No. 12/099,771.
Notice of Allowance dated Oct. 2, 2013, U.S. Appl. No. 12/099,771.
Office Action dated Jan. 13, 2011, U.S. Appl. No. 12/348,377.
Final Office Action dated Jun. 20, 2011, U.S. Appl. No. 12/348,377.
Advisory Action dated Aug. 30, 2011, U.S. Appl. No. 12/348,377.
Notice of Allowance dated Jan. 5, 2012, U.S. Appl. No. 12/348,377.
Office Action—Restriction dated Mar. 16, 2011, U.S. Appl. No. 12/348,371.
Office Action dated Mar. 31, 2015, U.S. Appl. No. 13/363,369, filed Jan. 31, 2012.
FAIPP Pre-Interview Communication dated Mar. 13, 2015, U.S. Appl. No. 13/750,831, filed Jan. 25, 2013.
First Action Interview Office Action dated May 6, 2015, U.S. Appl. No. 13/750,831, filed Jan. 25, 2013.
Office Action dated Mar. 5, 2012; U.S. Appl. No. 13/250,611, filed Sep. 30, 2011.
Final Office Action dated Oct. 5, 2012, U.S. Appl. No. 13/250,611, filed Sep. 30, 2011.
Advisory Action dated Dec. 19, 2012, U.S. Appl. No. 13/250,611, filed Sep. 30, 2011.
Notice of Allowance dated Jun. 21, 2013, U.S. Appl. No. 13/250,611, filed Sep. 30, 2011.
FAIPP Pre-Interview Communication dated Nov. 20, 2012, U.S. Appl. No. 13/344,096, filed Jan. 5, 2012.
FAIPP Office Action dated Jan. 31, 2013, U.S. Appl. No. 13/344,096, filed Jan. 5, 2012.
Notice of Allowance dated Jun. 11, 2013, U.S. Appl. No. 13/344,096, filed Jan. 5, 2012.
FAIPP Pre-Interview dated Dec. 24, 2014, U.S. Appl. No. 13/363,369, filed Jan. 31, 2012.
FAIPP Pre-Interview Communication dated Mar. 20, 2014, U.S. Appl. No. 13/482,731, filed May 29, 2012.
Notice of Allowance dated May 27, 2014, U.S. Appl. No. 13/482,731, filed May 29, 2012.
Ching, Andrew T., et al., "Payment Card Rewards Programs and Consumer Payment Choice", Journal of Banking & Finance, vol. 34, Issue 8, Aug. 2010, pp. 1773-1787, ISSN 0378-4266, http://dx.doi.org/10.1016/j.jbankfin.2010.03.015.
Zimmerman, Ann, "Check Out the Future of Shopping", The Wall Street Journal, Business, May 18, 2011, http://online.wsj,com/article/SB10001424052748703421204576329253050634700.html.
Garry, Michael, Kroger Test Prepares for Mobile Future:, SN, Supermarket News, Jun. 13, 2011, http://supermarketnews.com/technology/kroger-test-prepares-mobile-future.
Jones, Sally, "Industry Trends in POS Hardware for Mobile Devices", Aug. 31, 2011, http://pointofsale.com/20110831734/Mobile-POS-News/industry-trends-in-pos-hardware-for-mobile-devices.html.
Annan, Brandon C., et al., "Remote Deactivation of Near Field Communication Functionality," U.S. Appl. No. 13/363,369, filed Jan. 31, 2012.
Katzer, Robin Dale, et al., "Secure Online Credit Card Transactions," filed Jan. 25, 2013, U.S. Appl. No. 13/750,831.
Notice of Allowance dated Apr. 18, 2016, U.S. Appl. No. 13/363,369, filed Jan. 31, 2012.
Office Action dated Jun. 17, 2016, U.S. Appl. No. 13/750,831, filed Jan. 25, 2013.
Final Office Action dated Sep. 24, 2015, U.S. Appl. No. 13/750,831, filed Jan. 25, 2013.
Advisory Action dated Dec. 16, 2015, U.S. Appl. No. 13/750,831, filed Jan. 25, 2013.
Final Office Action dated Feb. 10, 2016, U.S. Appl. No. 13/363,369, filed Jan. 31, 2012.
Final Office Action dated Dec. 15, 2016, U.S. Appl. No. 13/750,831, filed Jan. 25, 2013.
Advisory Action dated Jan. 26, 2017, U.S. Appl. No. 13/750,831, filed Jan. 25, 2013.
Notice of Allowance dated Jul. 6, 2017, U.S. Appl. No. 13/750,831, filed Jan. 25, 2013.

* cited by examiner

PROVIDING SECURE ACCESS TO SMART CARD APPLICATIONS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Transaction devices are portable items that store data, such as credit cards, debit cards, gift cards, access cards, and cards for various prepaid services or goods. Magnetically encoded transaction devices typically store data in a magnetic strip. "Smart cards" are transaction devices that store data in nonvolatile memory, and typically contain data processing circuitry that offers some degree of computing capacity.

A smart card may be a "proximity read" transit card, which may communicate with a card reader without physically contacting the card reader. Communication between a proximity read smart card and various types of card readers may occur via a radio frequency signal, optical signal, wireless internet connection, or other communication method known in the art or hereafter developed. As an owner or a user of a smart card passes through a fare gate, a card reader may cause value to be automatically deducted from value stored on the smart card.

A mobile device, such as a mobile phone, may include a smart card. Thus, if a card reader is present at a location where commercial transactions occur or where proximity read smart cards are used, the smart card in the mobile device may make payments, provide access to restricted areas, and perform other functions or transactions typically performed by smart cards. A mobile device may implement the functionality of multiple smart cards by containing a super-smart card, a smart card that emulates or enables multiple smart cards by containing multiple smart card applications. A smart card application is the software, hardware, or combination of both that provides the capability of a smart card. Multiple smart card applications on a smart card enable the smart card to emulate multiple smart cards. A smart card application provider may issue both a smart card application for a mobile device and a physical smart card. However, if the owner of a mobile device containing a smart card application loses the mobile device or has the mobile device stolen, whoever has the mobile device can use the smart card application to make unauthorized purchases or gain unauthorized access to restricted areas.

SUMMARY

The present disclosure provides systems and methods for providing secure access to a smart card application. In some embodiments, an alert is received related to a mobile device having the smart card application. Access by the mobile device to the smart card application is restricted responsive to receiving the alert.

In some embodiments, the system includes a server and a component on the mobile device to restrict access to a smart card application on the mobile device. The server receives an alert related to the smart card application on the mobile device from a smart card application provider. The server promotes restricting access to the smart card application, via the component.

In some embodiments, a determination is made whether a mobile device that includes a smart card application is out of communication with a server during a period of time. Access to the smart card application is restricted in response to a determination that the mobile device is out of communication with the server during the period of time.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In some embodiments of the present disclosure, a mobile device's owner can use a computer or a telephone to submit an alert for a mobile device that contains a smart card application. The alert can report the mobile device as lost or stolen. As a result of receiving this alert, access to the smart card application is restricted. The access can be restricted by requiring a personal identification number (PIN) to access the smart card application, transferring digital cash from the smart card application, suspending the smart card application until an update of the mobile device's status is received, or deletion of the smart card application. After access to the smart card application is restricted, the mobile device can be deactivated.

In some embodiments of the present disclosure, the system includes both a server and a mobile device that includes the smart card application. The server receives an alert for the smart card application from a smart card application provider that may have received the alert from the mobile device user. The smart card application provider may also submit an alert that identifies fraudulent activity using the smart card application, or fraudulent activity with the corresponding user's account, such as after the corresponding plastic card in a leather wallet has been stolen. The server restricts access to the smart card application, and conveys the alert to another smart card application provider based on a record of the mobile device's smart card applications. Therefore, when the mobile device owner alerts only one smart card application provider about a missing mobile device, the alert is conveyed to the server for the mobile device. The server can restrict access to the smart card applications and forward the alert to all of the other smart card application providers for the mobile device even if the mobile device owner cannot immediately remember the other smart card application providers.

In other embodiments of the present disclosure, a determination is made whether a mobile device that includes a smart card application is out of communication with a server during a period of time. A mobile device thief may disable the mobile device's communications to prevent a server from restricting access to the smart card application after the mobile device is reported as missing. If the mobile device cannot communicate with the server during the specified period of time, such as an hour, access to the smart card application is restricted. The restriction may require the entry of a PIN selected by the mobile device owner to access the smart card application, a PIN that a mobile device thief is unlikely to know. This restriction can benefit the mobile device's owner by preventing fraudulent activity before the owner has time to report the theft to the smart card application provider, or even before the owner realizes that the mobile device has been stolen.

Figure 1:
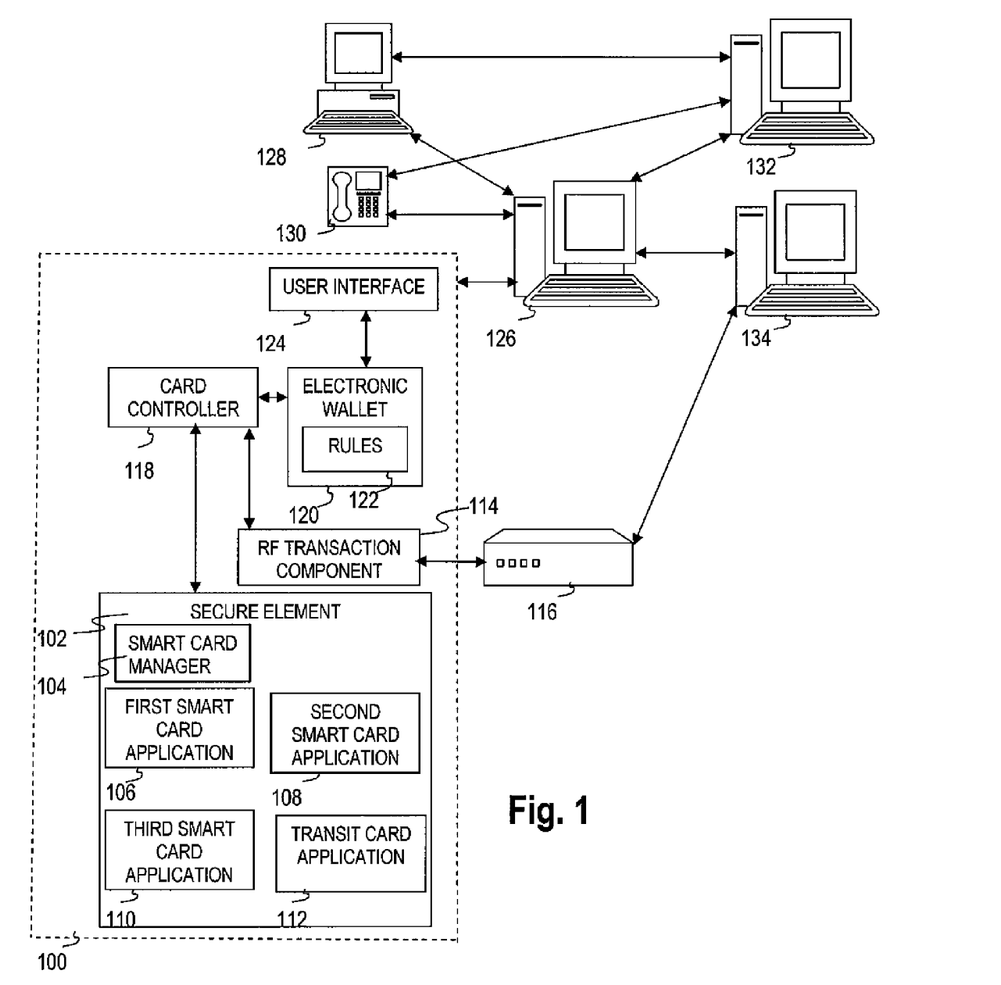
FIG. 1 shows a block diagram of a system for a providing secure access to smart card applications according to some embodiments of the present disclosure.

FIG. 1 shows a block diagram of a system for providing secure access to smart card applications according to an embodiment of the present disclosure. A mobile device 100 may include a secure element 102, which may include a smart card manager 104. The secure element 102 may be a smart card, a security information management (SIM) component, or other type of security device. The smart card manager 104 may activate, deactivate, and assist a mobile device owner or user in managing smart card applications for a transaction, such as a first smart card application 106, a second smart card application 108, a third smart card application 110, and a transit card application 112 on the secure element 102. The transit card application 112 is a smart card application that can include digital cash. If the mobile device 100 that includes the transit card application 112 is lost or stolen, access to the digital cash on the transit card application 112 is lost for the mobile device owner. Therefore, the result of losing any mobile device 100 that includes digital cash can be similar to losing physical cash. Embodiments of the present disclosure may transfer digital cash from the transit card application 112 and similar applications if the mobile device 100 is reported as lost or stolen. The smart card applications 106-110 can be either a loyalty card, an identification card, a credit card, a security card, a debit card, a bank account card, or a cash card. While four smart card applications are shown in FIG. 1, other numbers are also contemplated.

The mobile device 100 may include a radio frequency (RF) transaction component 114 to enable the secure element 102 to communicate with a vendor device by radio frequency, optical, infra-red, wired, magnetic "contact reader," or other known or hereafter developed communications. The vendor device may be point of sale, security, or any other vendor transaction device, such as a reader 116. The security for the secure element 102 may be enabled by hardware or software components on the mobile device 100, as part of the secure element 102, or combinations of both.

The ISO/IEC 7816 and ISO/IEC 7810 series of standards for contact smart cards define: the physical shape, the positions and shapes of the electrical connectors, the electrical characteristics, the communications protocols, the format of the commands sent to the card and the responses returned by the card, robustness of the card, and the functionality. The standard for contactless smart card communications is ISO/IEC 14443, dated 2001. An alternative standard for contactless smart cards is ISO 15693, which allows communications at distances up to 50 cm. However, systems applying other standards may be used and are within the spirit and scope of the present disclosure.

The mobile device 100 contains a card controller 118 and an electronic wallet 120. The card controller 118 may enable the electronic wallet 120 to communicate with the smart card manager 104 on the secure element 102. The card controller 118 is responsible for accessing the hardware registers of the smart card manager 104 and often includes an interrupt handler to service interrupts generated by the smart card manager 104. The electronic wallet 120 is an application that, in addition to providing the mobile device user with information regarding smart card applications 106-112, may enable the user to access and select smart card applications on the secure element 102 for use in carrying out transactions. The electronic wallet 120 contains or has access to a set of context-based rules 122. The electronic wallet 120 may process the rules 122 and context information to determine which of the smart card applications 106-112 are appropriate for a transaction.

The mobile device 100 may also include a user interface 124, which enables an owner or user of the mobile device 100 to enter input to and receive output from the mobile device 100. The mobile device 100 may also communicate with a server 126 for mobile device communication. The server 126 may activate, deactivate, and assist an owner in managing smart card applications. The server 126 can operate automatically, function with human intervention as part of a customer service system, or any combination thereof. The mobile device 100, the user interface 124, and the server 126 are described in more detail below in reference to FIGS. 4 to 7.

The mobile device owner may use either a computer 128 or a telephone 130 to send an alert to the server 126, to alert the server 126 when the mobile device 100 has been lost or stolen. The server 126 can forward the alert to a computer 132 associated with a smart card application provider and a computer 134 associated with a transit card application provider. The computer 132 and the computer 134 can each operate automatically, function with human intervention as parts of customer service systems, or any combination thereof. Alternatively, the mobile device owner can send the alert to both the computers 132 and 134. Furthermore, the computer 132 for the smart card application provider can forward an alert from the mobile device owner to the server 126, where the alert specifies either a missing mobile device 100 containing at least one smart card application or fraudulent activity using the smart card application. The server 126 can forward the alert from the computer 132 to the computer 134 for the transit card application provider, which can instruct the reader 116 to not use or authorize the smart card application transaction.

Figure 2:
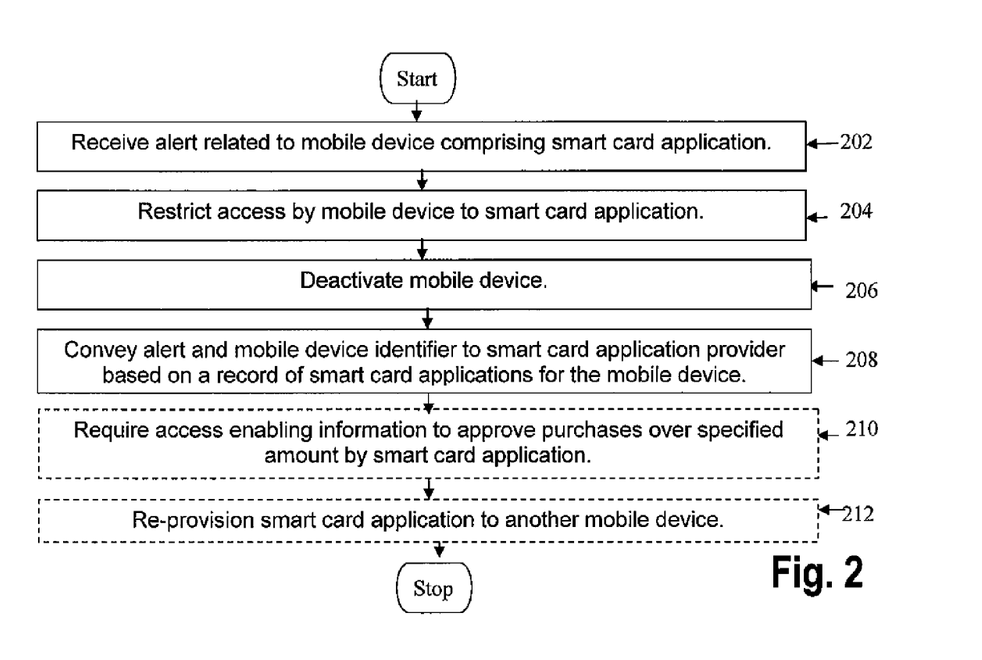
FIG. 2 shows a flowchart of a method for providing secure access to smart card applications according to some embodiments of the present disclosure.

FIG. 2 is a flowchart illustrating an embodiment of providing secure access to smart card applications according to an embodiment of the present disclosure. A mobile device owner may use the method to provide secure access to smart card applications.

In box 202, the server receives an alert related to a mobile device that contains a smart card application. For example, the owner for the mobile device 100 containing the smart card applications 106-112 submits an alert to the server 126. The mobile device owner can submit the alert via the computer 128 or the telephone 130. Alternatively, the server 126 can receive the alert from the computer 132 for the smart card application provider if the mobile device owner has already sent the alert to the computer 132. Additionally, the computer 132 can submit the alert to the server 126 if the computer 132 detects fraudulent activity using any of the smart card applications 106-112.

In box 204, the server restricts access to the smart card application. For example, the server 126 can communicate with the mobile device 100 over the air to restrict access to the smart card applications 106-112 in a variety of ways. The server 126 can instruct the mobile device 100 to require access enabling information, such as entry of a PIN, to access the smart card applications 106-112.

The server 126 can also transfer any digital cash from the smart card applications 106-112 back to the server 126 for future use by the mobile device owner. For example, the server 126 can transfer or otherwise adjust or credit $50.00 from the transit card application 112 back to the server 126, such that the loss of the mobile device 100 does not result in a loss of the $50.00 in digital cash on the transit card application 112 for the mobile device owner.

The server 126 can instruct the mobile device 100 to suspend use of the smart card applications 106-112 until receipt of an update. For example, because the mobile device owner believes that he left his mobile device 100 at a friend's house, the mobile device owner does not want to delete the smart card applications 106-112 from the mobile device 100. If the mobile device owner finds his mobile device 100 at his friend's home, the mobile device owner does not want to contact all of the smart card application providers and participate in the lengthy re-provisioning process that would be required after deleting the smart card applications 106-112 from the mobile device 100. If the mobile device owner subsequently sends an update to the server 126 specifying that the mobile device 100 has been located, the server 126 can lift the suspension on the use of the smart card applications 106-112. If the mobile device owner subsequently sends an update to the server 126 specifying that the mobile device 100 was not located, the server 126 can keep the smart card applications 106-112 in indefinite suspension, or restrict access to the smart card applications 106-112 in any other way that is chosen by the owner.

The server 126 can have the option of suspending the use of only the smart card applications 106-112 that are not protected by a requirement for access enabling information, such as entry of a PIN. The mobile device owner may have selected to protect major credit cards by requiring a PIN to prevent expensive purchases if the mobile device 100 is lost or stolen. However, the mobile device owner may have also selected to not protect the transit card application 112 with a PIN requirement because the mobile device owner wants to quickly access a subway system without having to stop and enter a PIN. Additionally, the mobile device owner may have also selected to not protect the third smart card application 110 with a PIN requirement because the mobile device user wants to conveniently purchase coffee at a coffee shop with the third smart card application 110, which has a maximum value of only $25.00.

The server 126 can instruct the mobile device 100 to delete the smart card applications 106-112. For example, if the mobile device owner knows that the mobile device 100 is stolen, the mobile device owner can select to delete the smart card applications 106-112 because of the small possibility of recovering the stolen mobile device 100. The mobile device owner may have already selected the option of deleting only the smart card applications 106-112 that are not protected by a requirement for access enabling information such as a PIN.

In box 206, the server deactivates the mobile device. For example, the server 126 deactivates the mobile device 100 after transferring digital cash from the transit card application 112, requiring a PIN to access the first smart card application 106, suspending the second smart card application 108, and deleting the third smart card application 110. As illustrated by this example, the mobile device owner can specify different access restrictions for each of the smart card applications 106-112.

In box 208, the server conveys the alert and a mobile device identifier to a smart card application provider based on a record of smart card applications for the mobile device. For example, the server 126 conveys the alert and a mobile device identifier to the computer 132 for a smart card application provider based on a record of the mobile device's 100 smart card applications. The server 126 may not have all of the account information for each smart card application, but providing the unique mobile device identifier may be sufficient for the smart card application provider to identify the relevant smart card application information for the mobile device owner. The alert may have been initially provided to the server 126 by the mobile device owner or by another smart card application provider, who may have been alerted by the mobile device owner.

The server 126 can convey the alert and the mobile device identifier only for the smart card applications 106-112 that are not protected by access enabling information. For example, the mobile device owner selects a PIN access requirement to protect the first smart card application 106 that can enable expensive purchases, but chooses not to protect the smart card applications 108-112 with a PIN requirement for convenience and because the smart card applications 108-112 are not capable of enabling expensive purchases.

The conveyed alert can request the computer 132 for the smart card provider or the computer 134 for the transit card application provider to instruct the card reader 116 to deny access for the smart card applications 106-112. For example, the mobile device owner may be concerned that the thief that stole the mobile device 100 has disabled communications for the mobile device 100. If the mobile device's 100 communications are disabled, the server 126 may not be able to communicate with the mobile device 100 to instruct the mobile device 100 to transfer digital cash or to protect, suspend, or delete the smart card applications 106-112. However, the alert can instruct the reader 116 to deny access for the smart card applications 106-112.

The alert can also initiate a request to re-provision the smart card application 106-112 to another mobile device 100. For example, when the mobile device owner has purchased or leased a replacement mobile device 100 for the stolen mobile device 100, the mobile device owner can submit an alert that requests for the server 126 to re-provision the smart card applications 106-112 to the replacement mobile device 100.

In box 210, the server optionally requires access enabling information for approving purchases over a specified amount by the smart card application. For example, the server 126 requires the entry of a PIN for approving purchases over a thousand dollars by the first smart card application 106. The mobile device owner may also use this option to prevent unauthorized expenses over a certain amount, such as for example if the mobile device owner loans his mobile device 100 to a child or friend, but has authorized an inexpensive purchase.

In box 212, the server optionally re-provisions the smart card application to another mobile device. For example, the server 126 re-provisions the smart card applications 106-112 to a replacement mobile device 100 as requested by the mobile device owner.

Figure 3:
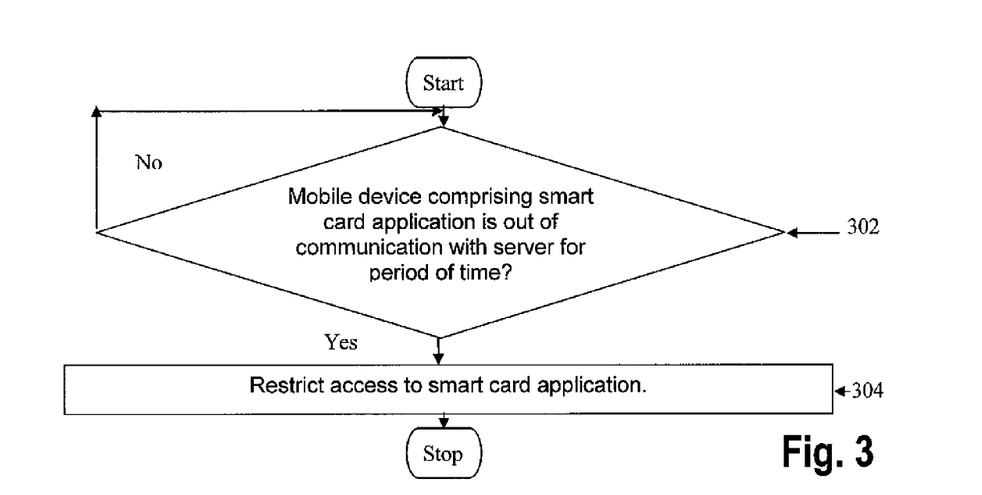
FIG. 3 shows a flowchart of another method for providing secure access to smart card applications according to some embodiments of the present disclosure.

FIG. 3 is a flowchart illustrating an embodiment of providing secure access to smart card applications according to an embodiment of the present disclosure. The mobile device 100 may use the method to provide secure access to the smart card applications 106-112 when the mobile device 100 is not reported as missing, but may be out of communication.

In box 302, the mobile device including the smart card application determines whether the mobile device is out of communication with a server during a period of time. For example, the mobile device 100 containing the smart card applications 106-112 determines whether the mobile device 100 is out of communication with the server 126 for an hour. This may be useful in an instance, for example, when a mobile device thief has disabled communications between the mobile device 100 and the server 126 to prevent the server 126 from instructing the mobile device 100 to restrict access to the smart card applications 106-112. For example, if the current user of the mobile device 100 selects airplane mode, the mobile device 100 is not able to communicate with the server 126, but the smart applications 106-112 can still be used for transactions. If the mobile device 100 is out of communication with the server 126 during the specified period of time, the method continues to box 304. If the mobile device 100 can communicate with the server 126 during the specified period of time, the method returns to box 302 to continue periodic checking. When the mobile device 100 is out of communication with the server 126, the mobile device 100 may have disabled or suspended communication with the server 126.

In box 304, the mobile device comprising the smart card application restricts access to the smart card application in response to a determination that the mobile device is not communicating or responding to the server during a period of time. The restriction in access to the smart card applications 106-112 can be accomplished through any of the restrictions listed above in the description of box 204. For example, in response to a determination that the mobile device 100 does not communicate with the server 126 for one hour, the mobile device 100 requires the entry of a PIN previously selected by the mobile device owner to access the smart card applications 106-112.

The mobile device 100 may be out of communication with the server 126 for the specified period of time, such as when the mobile device owner is in a shopping mall. The mobile device 100 may still access the smart card applications 106-112 to make a purchase at the mall, provided that the mobile device owner meets the restricted access requirements, such as entering a PIN. This communication requirement maintains convenience of smart car application use for the mobile device owner, but with a protection against mobile device thieves. A mobile device thief may put the mobile device 100 in airplane mode in an attempt to prevent the server 126 from restricting access to the mobile device 100 based on the mobile device owner reporting the mobile device 100 as stolen. Although the mobile device 100 may not be out of communication with the server 126 for the normally specified period of time yet, the mobile device 100 may act immediately to restrict access to the smart card applications 106-112 when the mobile device 100 is in airplane mode. If the mobile device 100 is in airplane mode, the mobile device user is required to meet the restriction access requirements, such as entering a PIN, to access the smart card applications 106-112 to make a purchase, for example, while on an airplane.

Figure 4:
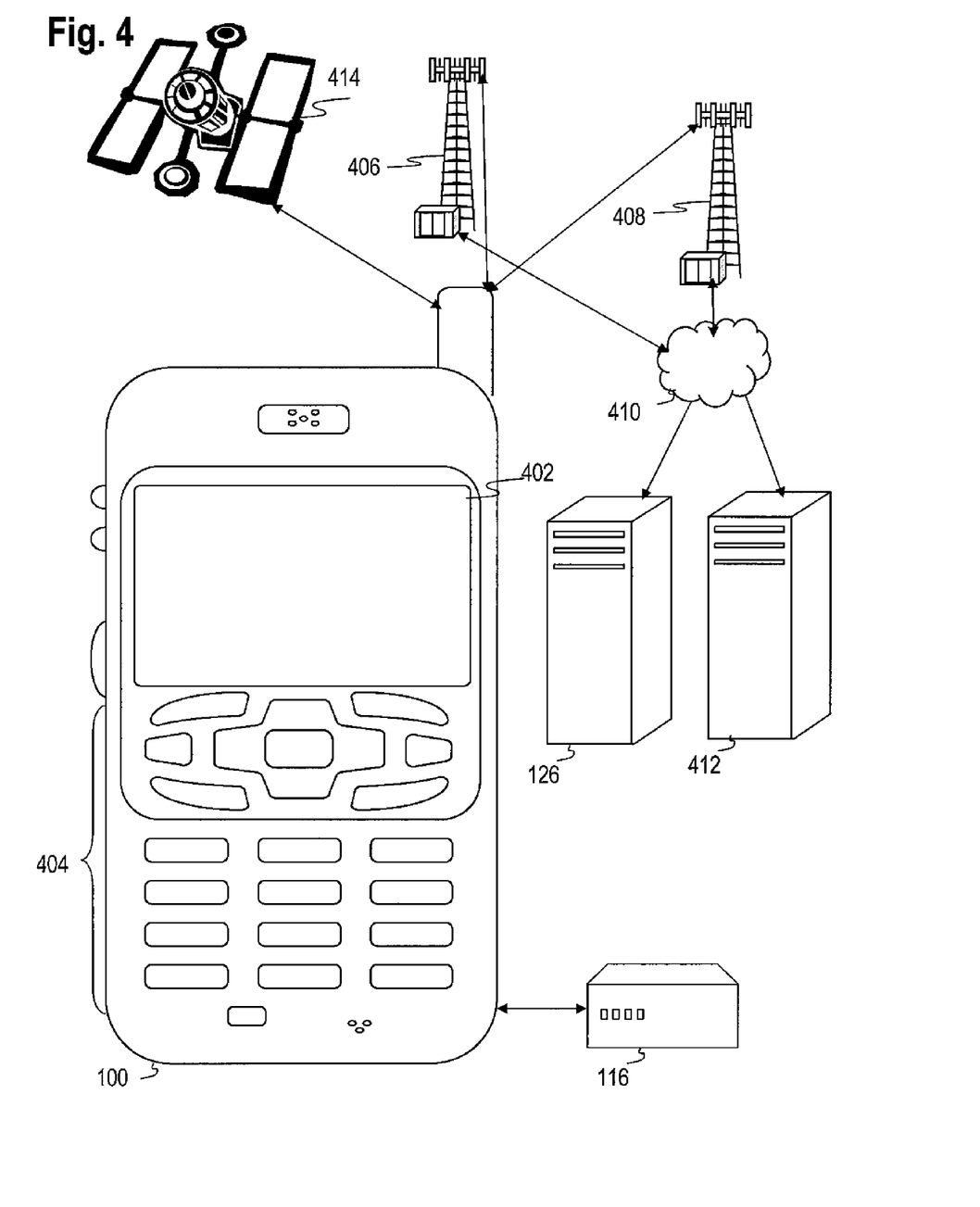
FIG. 4 shows an illustrative wireless communications system.

FIG. 4 shows a wireless communications system which provides the context for the systems and methods of the present disclosure. The wireless communication system includes the mobile device 100. Though illustrated as a mobile phone, the mobile device 100 may take various forms including a personal digital assistant (PDA), a mobile computer, a digital camera, a digital music player, and an electronic key fob for keyless entry. Many suitable mobile devices combine some or all of these functions.

The mobile device 100 includes a display 402 and a touch-sensitive surface or keys 404 with which to interact with a user. The user interface 124 can include the display 402 and the keys 404. The mobile device 100 may present options for the user to select, controls for the user to actuate, and/or cursors or other indicators for the user to direct. The mobile device 100 may further accept data entry from the user, including numbers to dial or various parameter values for configuring the operation of the mobile device 100. The mobile device 100 may further execute one or more software or firmware applications in response to user commands. These applications may configure the mobile device 100 to perform various customized functions in response to user interaction.

The mobile device 100 may communicate through either a first cell tower 406 or a second cell tower 408 and through a wired or wireless network 410 to access information on various servers, such as the server 126. The server 126 may interact with a payment source server 412 through the wired network 410. While two servers are shown in FIG. 4, other servers could be present. The server 126 may act as a gateway to the payment source server 412, which may include information needed by the electronic wallet 120 to access smart card applications on the secure element 102. The payment source server 412 may interact with the server 126, which may communicate with the mobile device 100 through the wired network 410 and either the first cell tower 406 or the second cell tower 408 by a standard wireless telephony protocol (such as code division multiple access), a wireless internet connection, or some other means of wireless communication. The mobile device 100 may also communicate through the reader 116 for a transaction via either a contact communication or a contact-less communication. Additionally, the mobile device 100 may communicate with a global positioning satellite 414 to determine the location of the mobile device 100.

In some embodiments of the present disclosure, the mobile device 100 can execute a location fix technology to generate a location fix and use the location of the mobile device 100 as described in FIG. 4. For example, the mobile device 100 can execute a global positioning system (GPS) technology, a forward link triangulation technology, or a hybrid location fix technology to determine the location of the mobile device 100.

Global positioning system satellites transmit signals that are received by the mobile device 100. The mobile device 100 determines its position based on the different signals received from different satellites. The location accuracy is environment driven and dependant on the type of equipment used. The global positioning system technology is owned and operated by the U.S. Department of Defense, but is available for general use around the world.

Furthermore, the mobile device 100 can use forward link triangulation technology to determine its position based on the different radio frequency signals received from different cell towers, such as the first cell tower 406 and the second cell tower 408. In radio communications, a forward link is the link from a fixed location, such as the cell tower 406, to the mobile device 100. If the link includes a communications relay satellite, the forward link will consist of both an uplink from a base station to the satellite and a downlink from the satellite to the mobile device 100. Each serving cell tower broadcasts a system parameters information message to the mobile device 100. This message includes the longitude and the latitude of the serving cell tower. The radius covered by serving cell towers vary greatly, from hundreds of meters in dense urban areas to 20 miles or more in rural environments.

The forward link triangulation technology fixes the location of the mobile device 100 based on measurements taken of time and distance signals from nearby cell towers. The mobile device 100 reports the time and distance measurements to the network 410, then the network 410 triangulates a location fix of the mobile device 100, and reports the location fix back to mobile device 100. In general, more than three surrounding cell towers are preferred to triangulate an optimal location fix.

The mobile device 100 can use a hybrid technology to fix the location of the mobile device 100 based on a combination of other location fix technologies. For example, if the mobile device 100 is indoors, but close to a window, the global positioning system technology in combination with a cell tower location technology can calculate the location fix for the mobile device 100. When the mobile device 100 is indoors, the mobile device 100 may receive signals from an insufficient number of satellites to determine the position of the mobile device 100. However, the hybrid technology can combine the signals from the insufficient number of satellites with the cell tower location identified by the channel length modulation (CLM) to calculate a hybrid location fix for the mobile device 100.

Figure 5:
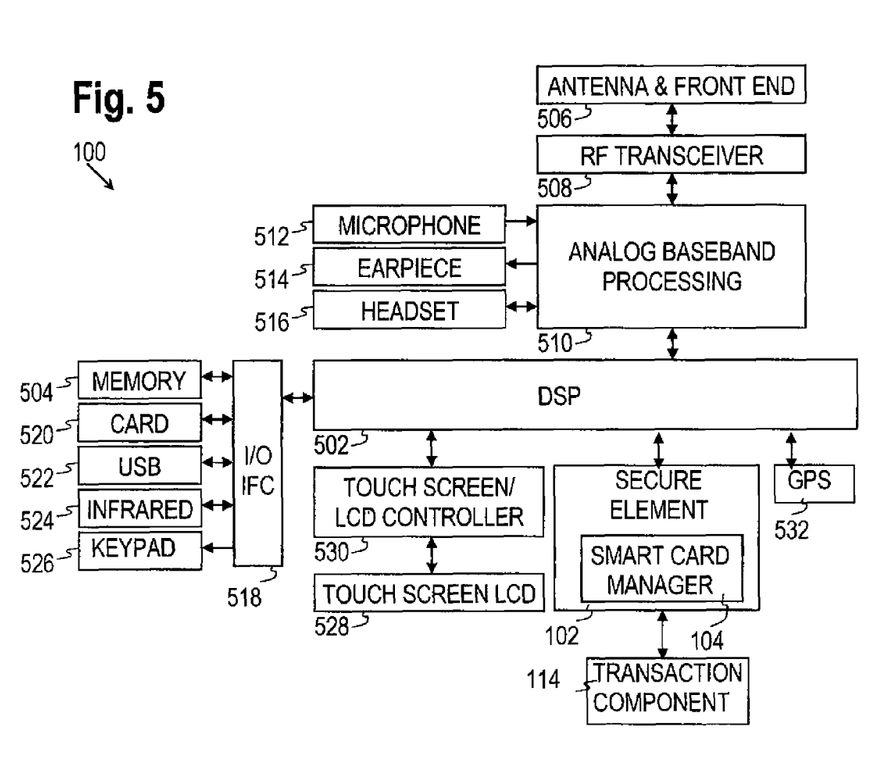
FIG. 5 shows a block diagram of an illustrative mobile device.

FIG. 5 shows a block diagram of the mobile device 100. The mobile device 100 includes a digital signal processor (DSP) 502 and a memory 504. As shown, the mobile device 100 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, an infrared port 524, a keypad 526, a liquid crystal display (LCD) with a touch sensitive surface 528, a touch screen/LCD controller 530, a global positioning system sensor 532, the secure element 102, the smart card manager 104 for the secure element 102, and the RF transaction component 114.

The DSP 502 or some other form of controller or central processing unit operates to control the various components of the mobile device 100 in accordance with embedded software or firmware stored in the memory 504. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502 to execute the methods described above for providing secure access to smart card applications.

The antenna and front end unit 506 may be provided to convert between wireless signals and electrical signals, enabling the mobile device 100 to send and receive information from a cellular network or some other available wireless communications network. The RF transceiver 508 may provide frequency shifting, e.g., converting received RF signals to baseband and converting baseband transmit signals to RF. The analog baseband processing unit 510 may provide channel equalization and signal demodulation to extract information from received signals, and may code and modulate information to create transmit signals, and may provide filtering for signals. To that end, the analog baseband processing unit 510 may have ports for connecting to the built-in microphone 512 and the earpiece speaker 514 that enable the mobile device 100 to be used as a cell phone.

The DSP 502 may send and receive digital communications with a wireless network via the analog baseband processing unit 510. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The infrared port 524 and other optional ports such as a Bluetooth interface or an IEEE 802.11 compliant wireless interface may enable the mobile device 100 to function as a smart card, communicating wirelessly with other nearby mobile devices 100 and/or wireless base stations. In some contemplated systems, the mobile device 100 is able to wirelessly exchange information at a point-of-sale when placed near a suitable transceiver, such as the reader 116.

The keypad 526 couples to the DSP 502 via the I/O interface 518 to provide one mechanism for the user to make selections, enter information, and otherwise provide input to the mobile device 100. Another input mechanism may be the touch screen display 528, which may also display text and/or graphics to the user. The display controller 530 couples the DSP 502 to the touch screen display 528. The GPS sensor 532 is coupled to the DSP 502 to decode global positioning system signals, thereby enabling the mobile device 100 to determine its position. Alternatively, GPS processing may be provided by a dedicated GPS chip or processor. Various other peripherals may also be included to provide additional functions, e.g., radio and television reception.

Figure 6:
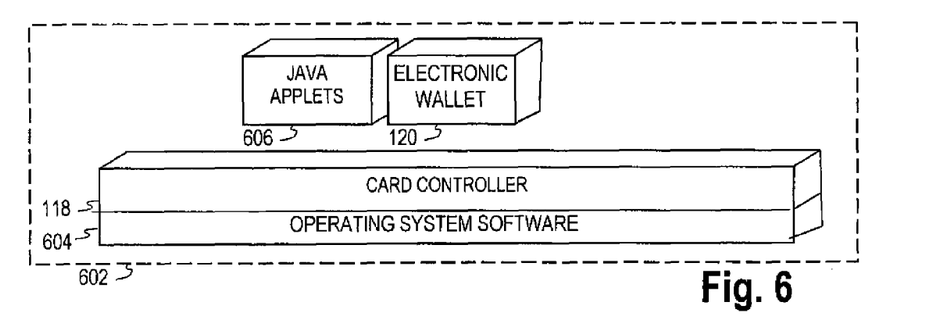
FIG. 6 shows a block diagram of an illustrative software configuration for a mobile device according to some embodiments of the present disclosure.

FIG. 6 illustrates a software environment 602 that may be implemented by the DSP 502. The DSP 502 executes operating system software 604 that provides a platform from which the rest of the software operates. The operating system generally provides processing resource management support. The operating system software 604 provides drivers for the mobile device hardware with standardized interfaces that are accessible to application software. The operating system software 604 may transfer control between applications running on the mobile device 100. Also shown in FIG. 6 are the card controller 118, JAVA applets 606, and the electronic wallet 120. The JAVA applets 606 may configure the mobile device 100 to browse the web, play music, play games, and provide utilities and other functionality.

The card controller 118 is a component that may be implemented as a hardware, firmware, or software device driver. Device drivers often form part of the lowest level of the operating system with which they are linked. Some systems have loadable device drivers which can be installed from files after the operating system is running. The electronic wallet 120 may obtain user input from the keys 404, the keypad 526 or the liquid crystal display (LCD) with a touch sensitive surface 528 through the touch screen/LCD controller 530, and may present output to a mobile device user through the display 402.

Figure 7:
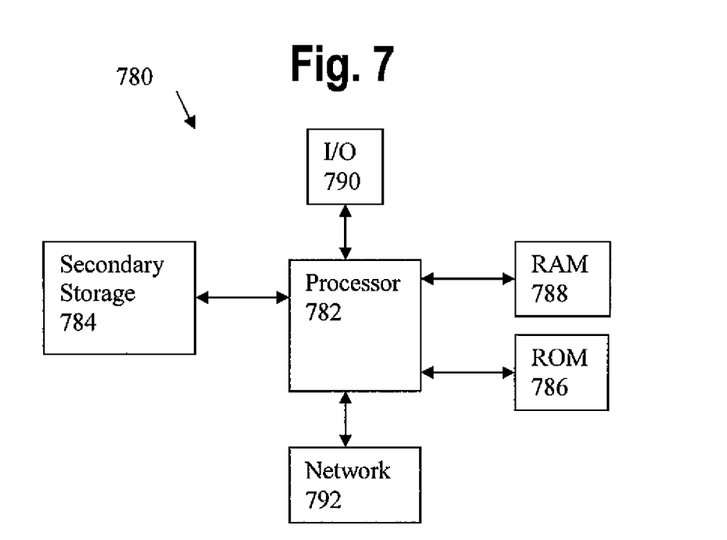
FIG. 7 illustrates an exemplary general purpose computer system suitable for implementing the several embodiments of the disclosure.

The system described above may be implemented on any general-purpose computer with sufficient processing power, memory resources, and network throughput capability to handle the necessary workload placed upon it. FIG. 7 illustrates a typical, general-purpose computer system, such as the server 126, suitable for implementing one or more embodiments disclosed herein. The computer system 780 includes a processor 782 (which may be referred to as a central processor unit or CPU) that is in communication with memory devices including secondary storage 784, read only memory (ROM) 786, random access memory (RAM) 788, input/output (I/O) devices 790, and network connectivity devices 792. The processor may be implemented as one or more CPU chips.

The secondary storage 784 is typically comprised of one or more disk drives or tape drives and is used for non-volatile storage of data and as an over-flow data storage device if RAM 788 is not large enough to hold all working data. Secondary storage 784 may be used to store programs which are loaded into RAM 788 when such programs are selected for execution. The ROM 786 is used to store instructions and perhaps data which are read during program execution. ROM 786 is a non-volatile memory device which typically has a small memory capacity relative to the larger memory capacity of secondary storage. The RAM 788 is used to store volatile data and perhaps to store instructions. Access to both ROM 786 and RAM 788 is typically faster than to secondary storage 784.

I/O devices 790 may include printers, video monitors, liquid crystal displays (LCDs), touch screen displays, keyboards, keypads, switches, dials, mice, track balls, voice recognizers, card readers, paper tape readers, or other well-known input devices. The network connectivity devices 792 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 792 may enable the processor 782 to communicate with an Internet or one or more intranets. With such a network connection, it is contemplated that the processor 782 might receive information from the network, or might output information to the network in the course of performing the above-described method steps. Such information, which is often represented as a sequence of instructions to be executed using processor 782, may be received from and outputted to the network, for example, in the form of a computer data signal embodied in a carrier wave Such information, which may include data or instructions to be executed using processor 782 for example, may be received from and outputted to the network, for example, in the form of a computer data baseband signal or signal embodied in a carrier wave. The baseband signal or signal embodied in the carrier wave generated by the network connectivity devices 792 may propagate in or on the surface of electrical conductors, in coaxial cables, in waveguides, in optical media, for example optical fiber, or in the air or free space. The information contained in the baseband signal or signal embodied in the carrier wave may be ordered according to different sequences, as may be desirable for either processing or generating the information or transmitting or receiving the information. The baseband signal or signal embodied in the carrier wave, or other types of signals currently used or hereafter developed, referred to herein as the transmission medium, may be generated according to several methods well known to one skilled in the art.

The processor 782 executes instructions, codes, computer programs, scripts which it accesses from hard disk, floppy disk, optical disk (these various disk based systems may all be considered secondary storage 784), ROM 786, RAM 788, or the network connectivity devices 792.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A system for providing secure access to a smart card application, comprising:
   a mobile device comprising a component that, upon execution of at least one processor:
      determines that the mobile device is in airplane mode or has been out of communication with a communication service provider for a pre-defined period of time,
      in response to the determination by the mobile device, restricts access to the smart card application stored in a non-transitory memory on the mobile device based on initiation, by the mobile device, of an access restriction specific to the smart card application wherein the smart card application is activated and provisioned with a smart card application provider prior to initiation of the access restriction; and a server that, upon execution by at least one processor of the server, receives an alert related to the smart card application on the mobile device from the smart card application provider, wherein the smart card application provider receives a notification that the mobile device is lost or stolen prior to the server receiving the alert, responsive to reception of the alert from the smart card provider, conveys the alert to another smart card application provider based on a record of smart card applications stored in the non-transitory memory of the mobile device, and initiates the access restriction targeting the smart card application via the component in response to receiving the alert, wherein access is restricted specifically to the smart card application by the access restriction that requires input of access enabling information into the mobile device to access the smart card application from the mobile device, and wherein the access restriction does not require re-provisioning the smart card application.

2. The system of claim 1, wherein the component configures a user interface of the mobile device based on the access restriction targeting the smart card application, the smart card application associated with at least one of a loyalty card, an identification card, a credit card, a security card, a debit card, a bank account card, or a cash card.

3. The system of claim 1, wherein the mobile device further comprises a plurality of smart card applications stored in the non-transitory memory of the mobile device, wherein the server initiates restricting access to the plurality of smart card applications via the component in response to receiving a second alert associated with another smart card application of the plurality of smart card applications, and wherein restricting access to the plurality of smart card applications further comprises applying a different access restriction to at least one of the plurality of smart card applications.

4. The system of claim 1, wherein the alert specifies at least one of a missing mobile device or fraudulent activity from the mobile device using the smart card application.

5. The system of claim 1, wherein the mobile device further comprises a hardware component that configures a user interface of the mobile device, and wherein the server further instructs the mobile device during a period of communication between the server and the mobile device to restrict access to the smart card application from the mobile device responsive to the mobile device determining that the mobile device has been out of communication with the server subsequent to a pre-defined period of time or being put into airplane mode.

6. A method for providing secure access to a smart card application stored in a non-transitory memory of a mobile device, comprising:

determining by the mobile device, that the mobile device is in airplane mode or has been out of communication with a communication service provider for a pre-defined period of time;

in response to the determination by the mobile device, restricting, by the mobile device based on initiation, by the mobile device, of an access restriction specific to the smart card application wherein the smart card application is activated and provisioned by the mobile device with a smart card application provider prior to initiation of the access restriction;

receiving, by a server, an alert related to the smart card application on the mobile device from the smart card application provider, wherein the smart card application provider receives a notification that the mobile device is lost or stolen prior to the server receiving the alert;

conveying the alert to another smart card application provider based on a record of smart card applications stored in the non-transitory memory of the mobile device in response to reception of the alert from the smart card provider; and initiating the access restriction targeting the smart card application via the component in response to receiving the alert, wherein access is restricted specifically to the smart card application by the access restriction that requires input of access enabling information into the mobile device to access the smart card application from the mobile device, and wherein the access restriction does not require re-provisioning the smart card application.

7. The method of claim 6, further comprising configuring, by the mobile device, a user interface of the mobile device based on the access restriction targeting the smart card application, the smart card application associated with at least one of a loyalty card, an identification card, a credit card, a security card, a debit card, a bank account card, or a cash card.

8. The method of claim 6, wherein the mobile device comprises a plurality of smart card applications stored in the non-transitory memory of the mobile device, wherein the method further comprises restricting, by the server, access to the plurality of smart card applications via the mobile device in response to receiving a second alert associated with another smart card application of the plurality of smart card applications, and wherein restricting access to the plurality of smart card applications further comprises applying a different access restriction to at least one of the plurality of smart card applications.

9. The method of claim 6, wherein the alert specifies at least one of a missing mobile device or fraudulent activity from the mobile device using the smart card application.

10. The method of claim 6, wherein the mobile device comprises a hardware component that configures a user interface of the mobile device, and wherein the method further comprises instructing, by the server, the mobile device during a period of communication between the server and the mobile device to restrict access to the smart card application from the mobile device responsive to the mobile device determining that the mobile device has been out of communication with the server subsequent to a pre-defined period of time or being put into airplane mode.

* * * * *